(12) United States Patent
Abotabl et al.

(10) Patent No.: US 12,003,438 B2
(45) Date of Patent: Jun. 4, 2024

(54) AGGREGATE COMPONENT CARRIER FOR FULL-DUPLEX OPERATION

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/444,448

(22) Filed: Aug. 4, 2021

(65) Prior Publication Data

US 2023/0042490 A1   Feb. 9, 2023

(51) Int. Cl.
*H04L 5/00* (2006.01)
*H04L 1/00* (2006.01)
(Continued)

(52) U.S. Cl.
CPC .......... *H04L 5/0037* (2013.01); *H04L 1/0025* (2013.01); *H04L 1/1819* (2013.01);
(Continued)

(58) Field of Classification Search
CPC ..... H04L 5/003; H04L 5/0037; H04L 5/0039; H04L 5/0041; H04L 1/0023;
(Continued)

(56) References Cited

U.S. PATENT DOCUMENTS

2013/0058294 A1* 3/2013 Miki .................. H04L 5/0053
                                                                  370/329
2013/0194981 A1* 8/2013 Wang ................ H04L 5/0055
                                                                  370/280
(Continued)

FOREIGN PATENT DOCUMENTS

CN         116097694    *  8/2020  ............ H04W 16/10
WO   WO-2019137777 A1  *  7/2019  ......... H04L 27/2607

OTHER PUBLICATIONS

3GPP TR 36.815: "3rd Generation Partnership Project, Technical Specification Group Radio Access Network, Further Advancements for E-UTRA, LTE-Advanced Feasibility Studies in RANWG4 (Release 9)", 3GPP Standard, 36815-910, 3rd Generation Partnership Project (3GPP), Mobile Competence Centre, 650, Route Des Lucioles, F-06921, Sophia-Antipolis Cedex, France, Jun. 21, 2010, XP050912597, sections 4, 5, pp. 1-29.
(Continued)

*Primary Examiner* — Warner Wong
(74) *Attorney, Agent, or Firm* — Harrity & Harrity, LLP

(57) ABSTRACT

Various aspects of the present disclosure generally relate to wireless communication. In some aspects, an apparatus of a user equipment (UE) may receive a configuration for an aggregate component carrier. The aggregate component carrier may include a combination of multiple component carriers. The apparatus may perform a half-duplex communication utilizing the aggregate component carrier. Numerous other aspects are described.

29 Claims, 10 Drawing Sheets

(51) Int. Cl.
  *H04L 1/1812* (2023.01)
  *H04L 1/1867* (2023.01)
  *H04L 5/14* (2006.01)
  *H04L 27/26* (2006.01)
(52) U.S. Cl.
  CPC ............ *H04L 1/1896* (2013.01); *H04L 5/001* (2013.01); *H04L 5/14* (2013.01); *H04L 27/2607* (2013.01)
(58) Field of Classification Search
  CPC ... H04L 1/0025; H04L 1/1812; H04L 1/1819; H04L 1/1867; H04L 1/1896; H04L 5/0005; H04L 5/0007; H04L 5/001; H04L 5/00; H04L 5/14; H04L 27/2605; H04L 27/2607
  See application file for complete search history.

(56) References Cited

U.S. PATENT DOCUMENTS

| | | | |
|---|---|---|---|
| 2014/0092786 A1 | 4/2014 | He et al. | |
| 2015/0063259 A1* | 3/2015 | Gohari | H04L 5/0092 370/329 |
| 2016/0309535 A1* | 10/2016 | Myoung | H04B 1/005 |
| 2016/0353442 A1* | 12/2016 | Uchino | H04L 5/001 |
| 2018/0019898 A1* | 1/2018 | Takahashi | H04L 5/0035 |
| 2018/0062707 A1* | 3/2018 | Chen | H04L 5/06 |
| 2018/0139750 A1* | 5/2018 | Takahashi | H04B 7/0486 |
| 2019/0053096 A1* | 2/2019 | Ng | H04L 5/001 |
| 2019/0069198 A1* | 2/2019 | Gheorghiu | H04W 16/14 |
| 2019/0261359 A1* | 8/2019 | Wang | H04L 5/0032 |
| 2020/0107308 A1* | 4/2020 | Liao | H04W 72/12 |
| 2020/0169377 A1* | 5/2020 | Lee | H04W 56/0015 |
| 2020/0178083 A1* | 6/2020 | Richards | H04W 72/0453 |
| 2020/0280969 A1* | 9/2020 | Liu | H04L 5/0053 |
| 2021/0194648 A1* | 6/2021 | Bassirat | H04W 76/10 |
| 2022/0377714 A1* | 11/2022 | Liu | H04L 5/0053 |
| 2023/0018640 A1* | 1/2023 | Marupaduga | H04W 52/244 |
| 2023/0020414 A1* | 1/2023 | Harada | H04W 72/12 |
| 2023/0042490 A1* | 2/2023 | Abotabl | H04L 27/2607 |
| 2023/0052535 A1* | 2/2023 | Shvodian | H04W 72/12 |

OTHER PUBLICATIONS

International Search Report and Written Opinion—PCT/US2022/074188—ISA/EPO—dated Oct. 25, 2022.

* cited by examiner

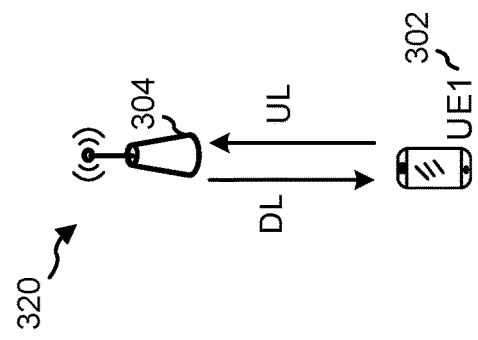
FIG. 3A
FIG. 3B
FIG. 3C

AGGREGATE COMPONENT CARRIER FOR FULL-DUPLEX OPERATION

FIELD OF THE DISCLOSURE

Aspects of the present disclosure generally relate to wireless communication and to techniques and apparatuses for aggregate component carrier for full-duplex (FD) operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving a configuration for an aggregate component carrier, wherein the aggregate component carrier includes a combination of multiple component carriers. The method may include performing a half-duplex (HD) communication utilizing the aggregate component carrier.

Some aspects described herein relate to a method of wireless communication performed by an apparatus of a base station. The method may include transmitting a configuration for an aggregate component carrier that includes a combination of multiple component carriers, wherein the aggregate component carrier has a common configuration across the multiple component carriers. The method may include performing an HD communication utilizing the aggregate component carrier.

Some aspects described herein relate to an apparatus for wireless communication. The apparatus may include a memory and one or more processors coupled to the memory. The one or more processors may be configured to receive a configuration for an aggregate component carrier, wherein the aggregate component carrier includes a combination of multiple component carriers. The one or more processors may be configured to perform an HD communication utilizing the aggregate component carrier.

Some aspects described herein relate to an apparatus for wireless communication. The apparatus may include a memory and one or more processors coupled to the memory. The one or more processors may be configured to transmit a configuration for an aggregate component carrier that includes a combination of multiple component carriers, wherein the aggregate component carrier has a common configuration across the multiple component carriers. The one or more processors may be configured to perform an HD communication utilizing the aggregate component carrier.

Some aspects described herein relate to a non-transitory computer-readable medium that stores a set of instructions for wireless communication by an apparatus of a UE. The set of instructions, when executed by one or more processors of the apparatus, may cause the apparatus to receive a configuration for an aggregate component carrier, wherein the aggregate component carrier includes a combination of multiple component carriers. The set of instructions, when executed by the one or more processors of the apparatus, may cause the apparatus to perform an HD communication utilizing the aggregate component carrier.

Some aspects described herein relate to a non-transitory computer-readable medium that stores a set of instructions for wireless communication by an apparatus of a base station. The set of instructions, when executed by one or more processors of the apparatus, may cause the apparatus to transmit a configuration for an aggregate component carrier that includes a combination of multiple component carriers, wherein the aggregate component carrier has a common configuration across the multiple component carriers. The set of instructions, when executed by the one or more processors of the apparatus, may cause the apparatus to perform an HD communication utilizing the aggregate component carrier.

Some aspects described herein relate to an apparatus for wireless communication. The apparatus may include means for receiving a configuration for an aggregate component carrier, wherein the aggregate component carrier includes a combination of multiple component carriers. The apparatus may include means for performing an HD communication utilizing the aggregate component carrier.

Some aspects described herein relate to an apparatus for wireless communication. The apparatus may include means for transmitting a configuration for an aggregate component carrier that includes a combination of multiple component carriers, wherein the aggregate component carrier has a common configuration across the multiple component carriers. The apparatus may include means for performing an HD communication utilizing the aggregate component carrier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3F are diagrams illustrating examples of full-duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
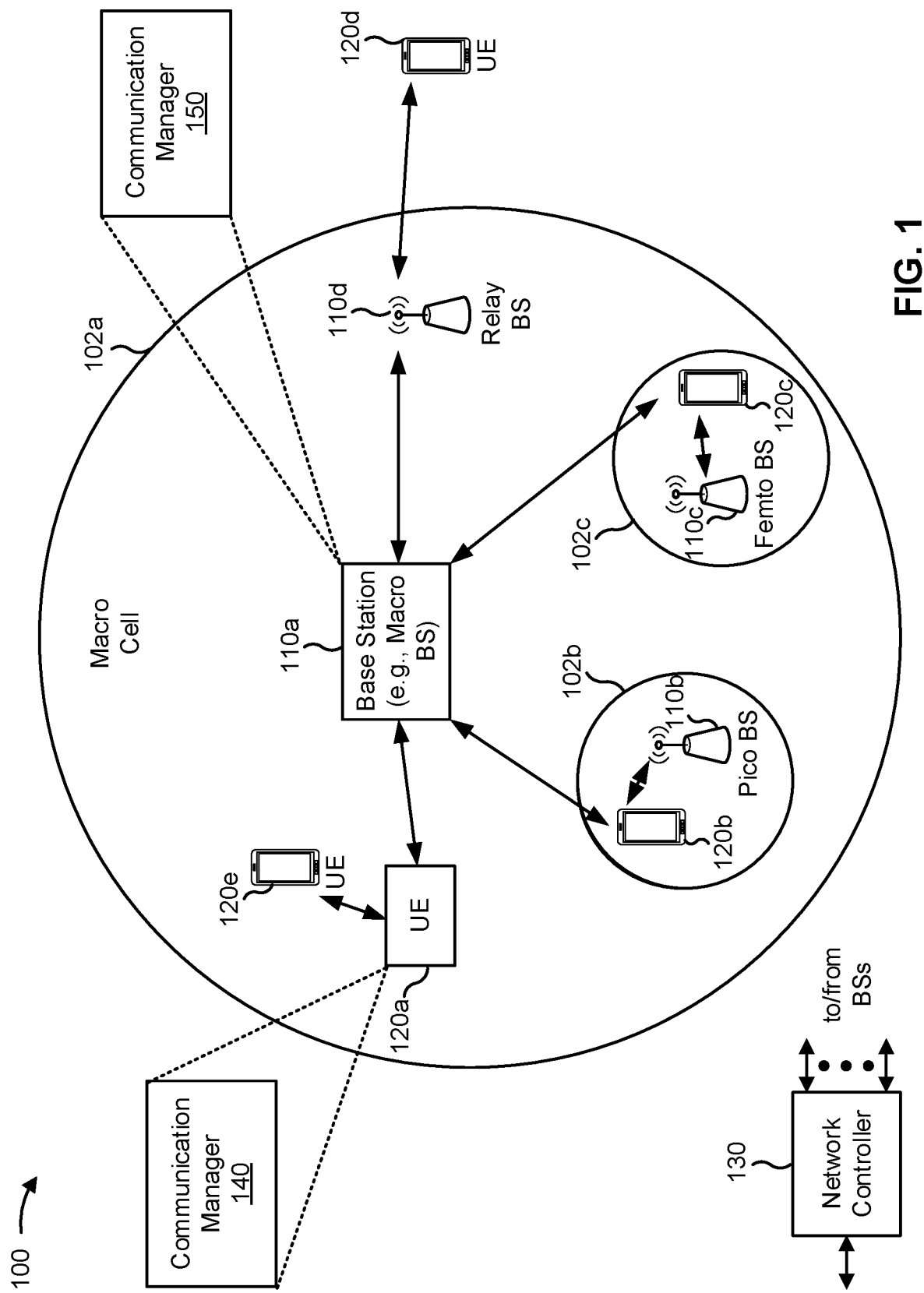
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with an aggregate component carrier for full-duplex (FD) operation. Additionally, or alternatively, the communication manager 140 may perform one or more other operations described herein.

In some aspects, the base station 110 may include a communication manager 150. As described in more detail elsewhere herein, the communication manager 150 may perform one or more operations associated with an aggregate component carrier for FD operation. Additionally, or alternatively, the communication manager 150 may perform one or more other operations described herein.

As indicated above, FIG. 1 is provided as an example. Other examples may differ from what is described with regard to FIG. 1.

Figure 2:
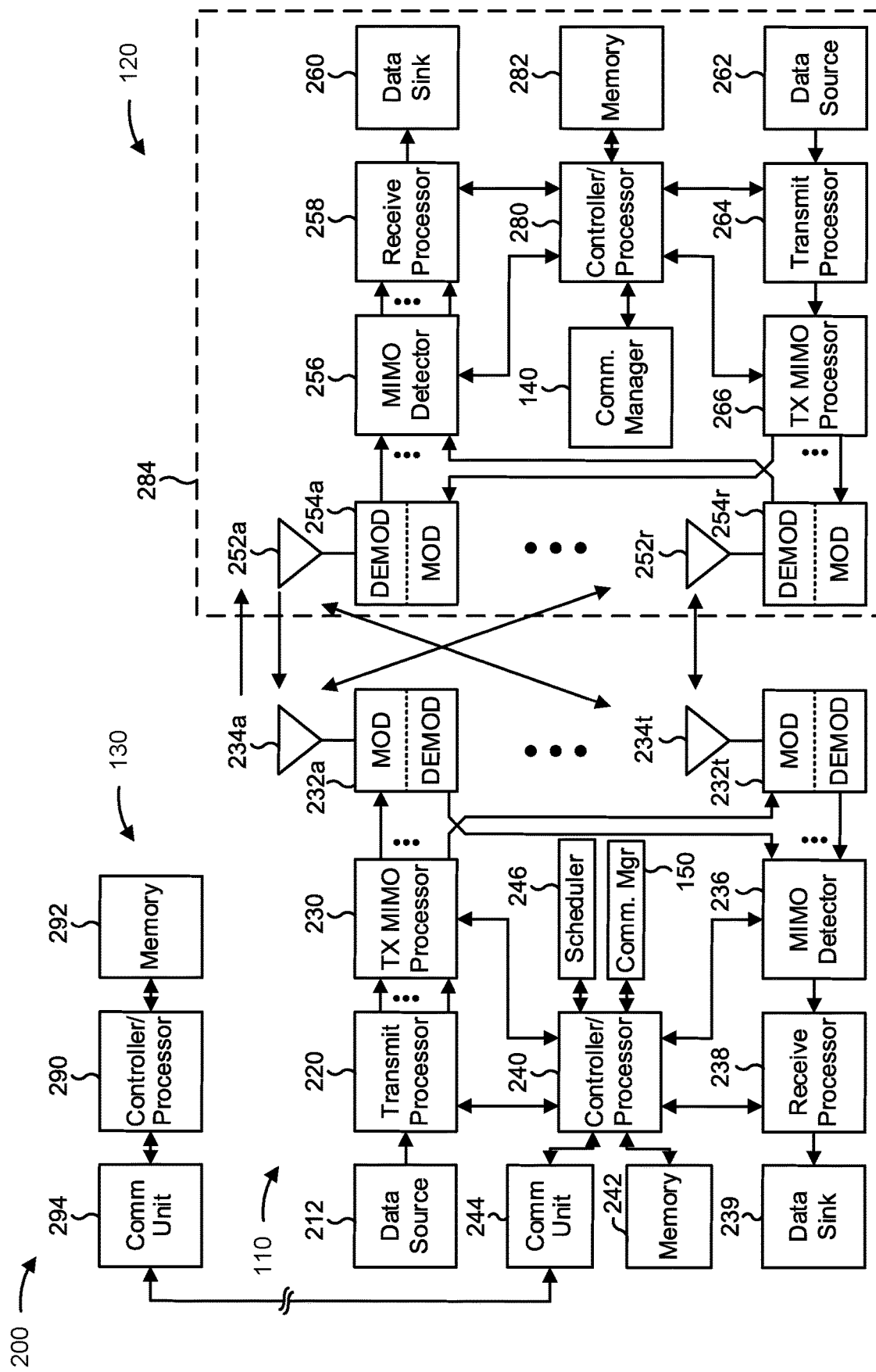
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, controller/processor 280 of the UE 120, and/or any other component(s) of FIG. 2 may perform one or more techniques associated with an aggregate component carrier for FD operation, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, UE 120 may include means for receiving a configuration for an aggregate component carrier, wherein the aggregate component carrier includes a combination of multiple component carriers, means for performing a half-duplex (HD) communication utilizing the aggregate component carrier, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, base station 110 may include means for transmitting a configuration for an aggregate component carrier that includes a combination of multiple component carriers, wherein the aggregate component carrier has a common configuration across the multiple component carriers, means for performing a HD communication utilizing the aggregate component carrier, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3F are diagrams illustrating examples 300, 310, 320, 330, 340, 350 of FD communication in accordance with the present disclosure. The example 300 of FIG. 3A includes a UE1 302 and two base stations (e.g., TRPs) 304-1, 304-2, where the UE1 302 is sending UL transmissions to base station 304-1 and is receiving DL transmissions from base station 304-2. In the example 300 of FIG. 3A, FD is enabled for the UE1 302, but not for the base stations 304-1, 304-2.

The example 310 of FIG. 3B includes two UEs, shown as UE1 302-1 and UE2 302-2, and a base station 304, where the UE1 302-1 is receiving a DL transmission from the base station 304 and the UE2 302-2 is transmitting an UL transmission to the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304.

FD communication may be in-band FD (IBFD) and/or sub-band FD (SBFD). For IBFD, a UE (e.g., UE1 302-1 and/or UE 302-2) and/or a base station (e.g., base station 304-1 and/or base station 304-2) may transmit and receive on the same time and frequency resource. The UL and the DL may share one or more frequency resources and/or time resources. In some cases, as shown by example 330 of FIG. 3D, the resources of the DL and the UL may fully overlap. In some cases, as shown by example 340 of FIG. 3E, the resources of the DL and the UL may partially overlap.

Figure 3E:
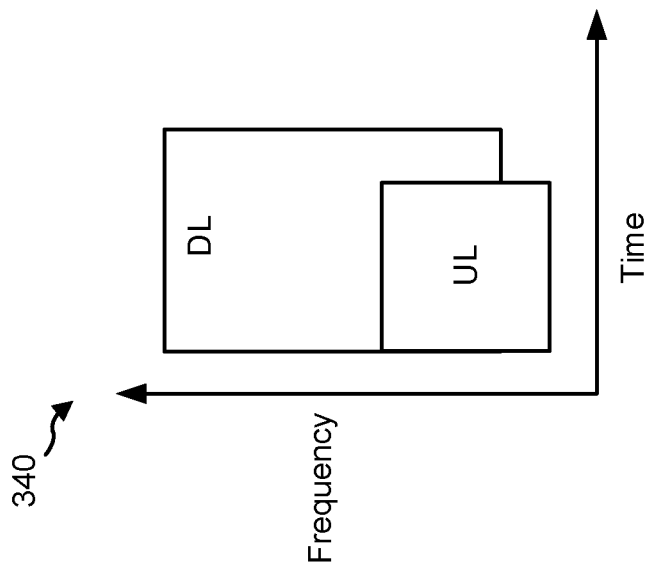
Figure 3D:
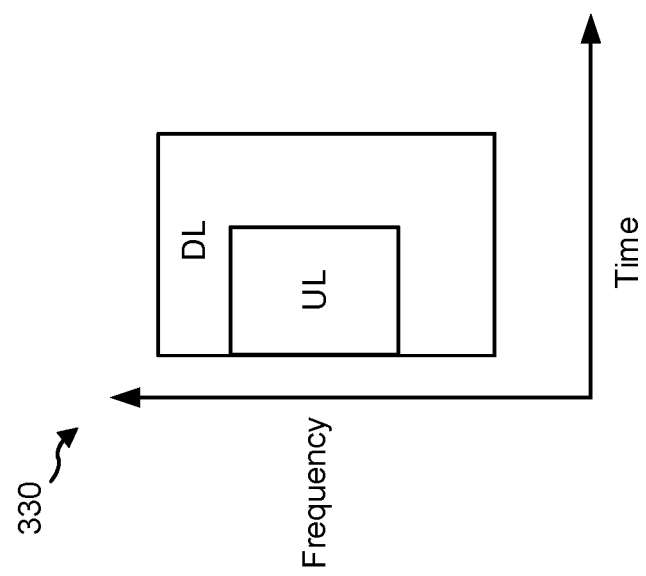
Figure 3F:
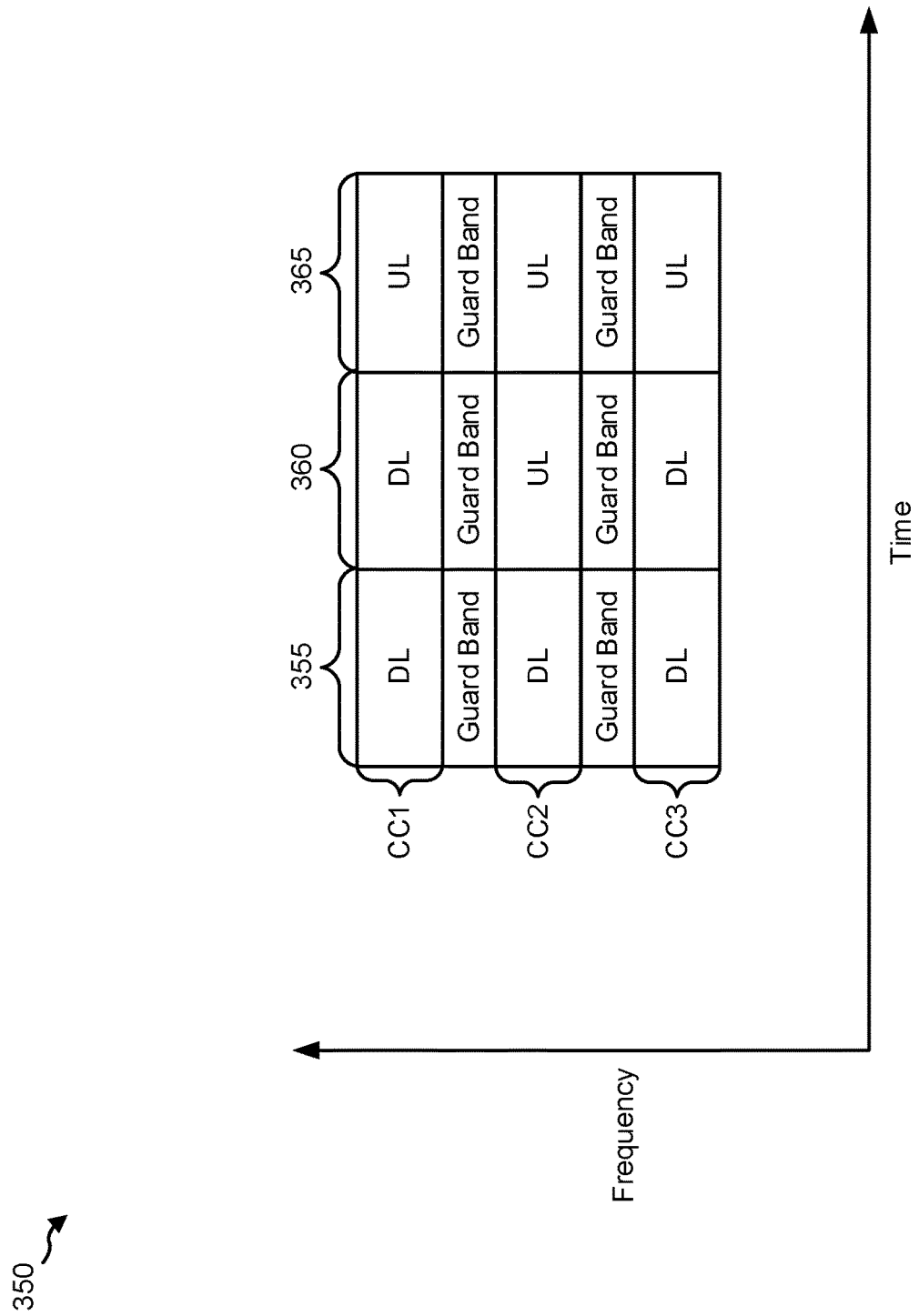

As shown by example 350 of FIG. 3F, for SBFD, a UE (e.g., UE1 302-1 and/or UE 302-2) and/or a base station (e.g., base station 304-1 and/or base station 304-2) may transmit and receive at the same time (e.g., during a same time slot, such as time slot 355, time slot 360, and/or time slot 360) but on different frequencies (e.g., via different component carriers (e.g., CC1, CC2, CC3)). In some cases, to reduce self-interference between UL and DL transmissions, base-station-to-base-station interference, and/or UE-to-UE interference, in each time slot frequency resources may be separated in the frequency domain. For example, as shown in FIG. 3F, a guard band may be implemented between different component carriers. The guard band may include a small amount of frequency resources (e.g., 0-10 RBs) occurring between frequency resources of the different component carriers.

In some cases, a group of component carriers for a time slot may be allocated for UL or DL transmissions. For example, for time slot 355, CC1, CC2, and CC3 are allocated for DL transmissions. As another example, for time slot 360, CC1 and CC3 are allocated for DL transmissions. As yet another example, for time slot 365, CC1, CC2, and CC3 are allocated for UL transmissions.

In some cases, for a particular time slot, each component carrier may be allocated for the same type of transmission (e.g., DL transmission) and may have the same configuration. However, each component carrier may be treated as being independent from the other component carriers, which may require each component carrier to be independently configured. Independently configuring each component carrier may increase signaling relative to configuring the component carriers as a single resource. Further, the frequency resources allocated to the guard bands may not be available to be utilized for the transmission, which may reduce spectrum efficiency.

Some techniques and apparatuses described herein enable a group of component carriers to be configured as an aggregate component carrier. In some implementations, each component carrier included in the aggregate component carrier has the same configuration. For example, configuring the aggregate component carrier may configure each component carrier, of the group of component carriers, of the aggregate component carrier. In this way, resources that otherwise would have been utilized to independently configure each component carrier may be conserved. In some implementations, the aggregate component carrier includes one or more guard bands separating the group of component carriers. By including the one or more guard bands, the aggregate component carrier may more efficiently utilize spectrum resources.

As indicated above, FIGS. 3A-3F are provided as one or more examples. Other examples may differ from what is described with regard to FIGS. 3A-3F.

Figure 4:
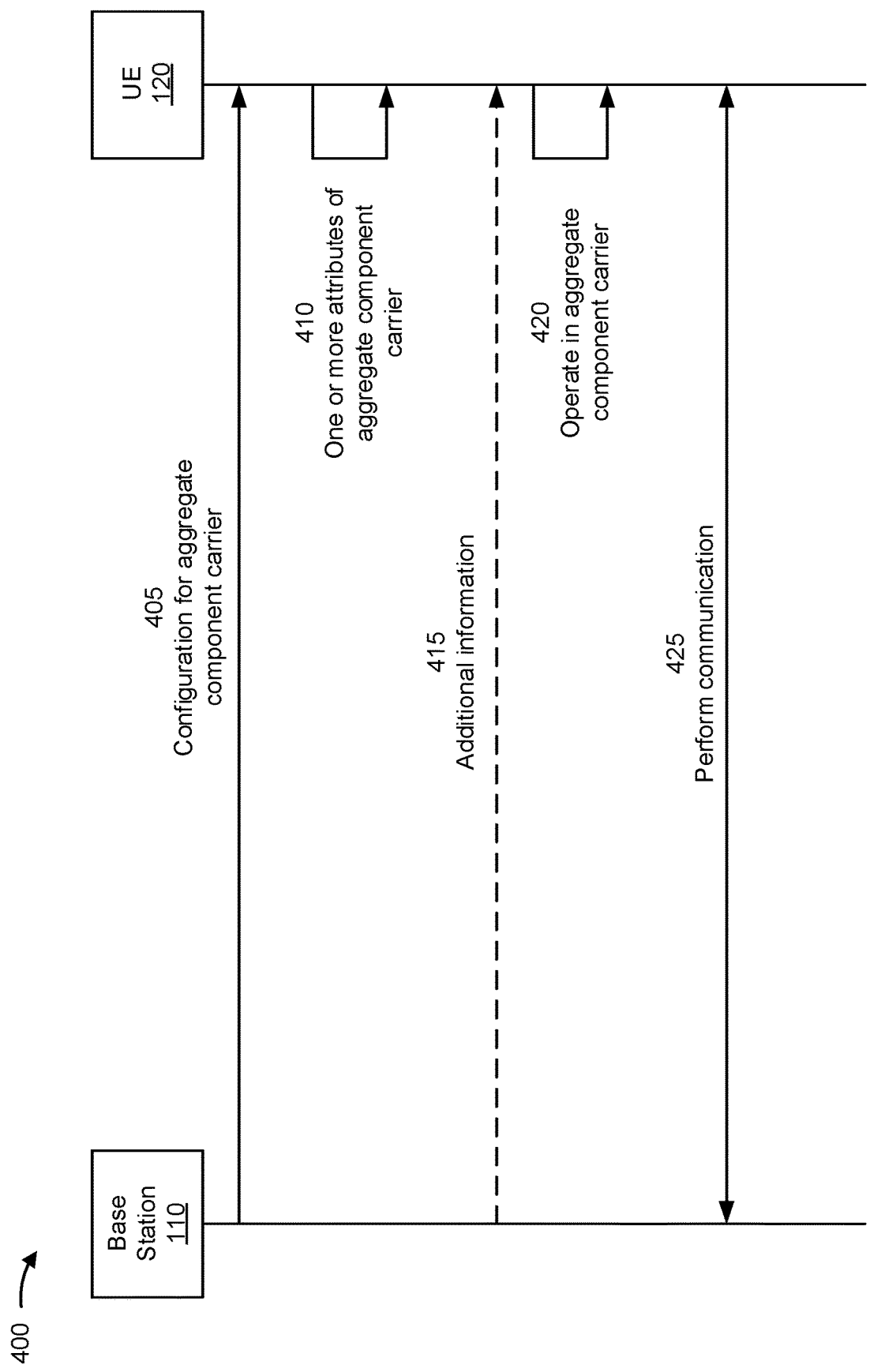
FIG. 4 is a diagram illustrating an example of carrier aggregation, in accordance with the present disclosure.

FIG. 4 is a diagram illustrating an example 400 associated with an aggregate component carrier for FD operation, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown by reference number 405, the UE 120 may receive a configuration for an aggregate component carrier. The aggregate component carrier may include a combination of multiple component carriers having a same configuration. The multiple component carriers may include contiguous component carriers, non-contiguous component carriers (e.g., at least one component carrier of the multiple component carriers being non-contiguous with another component carrier of the multiple component carriers), fully overlapping component carriers (e.g., at least one component carrier of the multiple component carriers being fully overlapping in the time domain and the frequency domain with another component carrier of the multiple component carriers), partially overlapping component carriers (e.g., at least one component carrier of the multiple component carriers being partially overlapping with another component carrier of the multiple component carriers), intra-band component carriers, and/or inter-band component carriers.

In some implementations, the configuration for the aggregate component carrier may indicate one or more attributes of the aggregate component carrier. In some implementations, the one or more attributes may include a subcarrier spacing (SCS) for the aggregate component carrier, a slot format indicator (SFI) for the aggregate component carrier, and/or a bandwidth part (BWP) associated with the aggregate component carrier, among other examples.

In some implementations, the aggregate component carrier and the multiple component carriers may have one or more common attributes. For example, the aggregate component carrier and the multiple component carriers may have a same SCS, a same slot format, and/or may be configured with the same BWPs.

As another example, one or more component carriers, of the multiple component carriers, may overlap in the frequency domain with the aggregate component carrier. In some implementations, each component carrier, of the multiple component carriers, may overlap in the frequency domain with the aggregate component carrier.

In some implementations, the aggregate component carrier may have one or more attributes that are different from one or more attributes of the multiple component carriers. For example, an SCS, a slot format, and/or a BWP of the aggregate component carrier may be different from an SCS, a slot format, and/or a BWP of one or more component carriers, of the multiple component carriers.

As shown by reference number 410, the user device may determine one or more attributes of the aggregate component carrier based at least in part on the configuration for the aggregate component carrier. In some implementations, the configuration for the aggregate component carrier may explicitly indicate one or more attributes for the aggregate component carrier. Alternatively, and/or additionally, the configuration for the aggregate component carrier may implicitly indicate one or more attributes for the aggregate component carrier, as described elsewhere herein.

In some implementations, the UE 120 may determine one or more attributes of the aggregate component carrier based at least in part on one or more attributes of the multiple component carriers. For example, the configuration for the aggregate component carrier may indicate that an SFI, an SCS, and/or a BWP associated with a component carrier, of the multiple component carriers, corresponds to an SFI, an SCS, and/or a BWP of the aggregate component carrier. In some implementations, the UE 120 determines that the one or more attributes associated with the component carrier correspond to one or more attributes of the aggregate component carrier based at least in part on the component carrier being indicated as a primary component carrier, of the multiple component carriers, as described elsewhere herein.

In some implementations, the aggregate component carrier may be configured with multiple BWPs. In some implementations, only one BWP, of the multiple BWPs, may be active during a time period.

In some implementations, the one or more BWPs may be associated with the multiple component carriers. For example, the multiple component carriers may include a first component carrier associated with a first BWP and a second component carrier associated with a second BWP, and the aggregate component carrier may be configured with the first BWP and/or the second BWP.

In some implementations, the first BWP and the second BWP may be separated by a frequency band (e.g., a guard band). In some implementations, the one or more BWPs of the aggregate component carrier include only the first BWP and the second BWP (e.g., the one or more BWPs do not include the guard band). In some implementations, the one or more BWPs of the aggregate component carrier include the first BWP, the second BWP, and the guard band.

In some implementations, the UE 120 determines the one or more attributes based at least in part on a type of channel associated with the aggregate component carrier. For example, the aggregate component carrier may be associated with a physical downlink shared channel (PDSCH). The UE 120 may determine that a configuration of a BWP associated with the aggregate component carrier corresponds to a configuration of a component carrier, of the multiple component carriers, associated with the PDSCH based at least in part on the aggregate component carrier and/or the component carrier being associated with the PDSCH.

In some implementations, the aggregate component carrier may be associated with a list of component carriers. For example, the configuration for the aggregate component carrier may indicate a list of component carriers associated with the aggregate component carrier and/or the aggregate component carrier. The UE 120 may obtain the list of component carriers from a data structure (e.g., a database, a table, and/or a list, among other examples) based at least in part on the configuration for the aggregate component carrier indicating the list of component carriers and/or the aggregate component carrier.

In some implementations, the list of component carriers may include the multiple component carriers, and the UE 120 may determine the multiple component carriers of the aggregate component carrier based at least in part on the multiple component carriers being included in the list of component carriers.

In some implementations, the list of component carriers indicates a primary component carrier associated with the aggregate component carrier. For example, the list of component carriers may indicate that a component carrier, of the multiple component carriers, is a primary component carrier associated with the aggregate component carrier.

In some implementations, a configuration of the aggregate component carrier may be based at least in part on a configuration of the primary component carrier. For example, the UE 120 may determine that a configuration of the aggregate component carrier corresponds to a configuration of the primary component carrier.

In some implementations, the UE 120 determines one or more attributes of the aggregate component carrier based on a mapping associated with the aggregate component carrier. For example, a radio resource control (RRC) configuration may indicate a mapping between one or more attributes of the aggregate component carrier and one or more attributes of a component carrier, of the multiple component carriers. The UE 120 may determine the one or more attributes of the aggregate component carrier based at least in part on the mapping.

In some implementations, a configuration of the aggregate component carrier is separate from a configuration of the multiple component carriers. For example, the configuration of the aggregate component carrier that is received by the UE 120 may be different from the configuration of the multiple component carriers.

In some implementations, as shown by reference number 415, the UE 120 may receive additional information associated with the aggregate component carrier. In some implementations, the additional information may include an indication of a component carrier (e.g., a component carrier of the multiple component carriers or the aggregate component carrier) on which scheduling resources on a PDSCH is to occur. For example, the UE 120 may receive downlink control information (DCI) indicating a component carrier of the multiple component carriers or the aggregate component carrier on which scheduling resources on a PDSCH is to occur.

In some implementations, the additional information may indicate resources allocated to the UE 120 for the aggregate component carrier and/or the multiple component carriers. For example, the additional information may indicate resources associated with a hybrid automatic repeat request (HARQ) acknowledgement for the aggregate component carrier and/or resources associated with a HARQ acknowledgement for the multiple component carriers, among other examples.

As shown by reference number 420, the UE 120 may determine to operate in the aggregate component carrier. In some implementations, the UE 120 may operate in an HD mode when the UE 120 operates in the aggregate component carrier. For example, the aggregate component carrier may include all of the component carriers associated with a time slot and each guard band separating the component carriers in the frequency domain. The UE 120 may operate in the HD mode based at least in part on the aggregate component carrier including all of the component carriers and each guard band separating the component carriers in the frequency domain.

In some implementations, the UE 120 may operate in the FD mode when the UE 120 operates in the multiple component carriers. For example, the UE 120 may operate in IBFD and/or SBFD when operating in the multiple component carriers.

In some implementations, the UE 120 may be semi-statically configured to operate in the aggregate component carrier and/or the multiple component carriers during a time slot. For example, the configuration of the aggregate component carrier may indicate that the UE 120 is to operate in the aggregate component carrier during a first time slot and that the UE 120 is to operate in the multiple component carriers during a second time slot.

In some implementations, the configuration of the aggregate component carrier may indicate a pattern of component carriers, and the UE 120 may operate in the aggregate component carrier when a time slot includes the pattern of component carriers. The pattern of component carriers may include all component carriers of a time slot being associated with DL transmissions, all component carriers of a time slot being associated with UL transmissions, and/or a first component carrier of a time slot being associated with DL transmissions, a second component carrier of the time slot being associated with UL transmissions, and a third component carrier of the time slot being associated with DL transmissions, among other examples.

In some implementations, the UE 120 may be dynamically configured to operate in the aggregate component carrier and/or the multiple component carriers during a time slot. For example, the UE 120 may receive an indication and may switch from operating in the multiple component carriers to operating in the aggregate component carrier based at least in part on the indication.

In some implementations, the indication and/or the other indication may be received via Layer 1 signaling. In some implementations, the indication and/or the other indication may be received via Layer 2 signaling.

As shown by reference number 425, the UE 120 may perform an HD communication utilizing the aggregate component carrier based at least in part on operating in the aggregate component carrier. In some implementations, the UE 120 may receive an indication while operating in the aggregate component carrier. The UE 120 may switch from operating in the aggregate component carrier to operating in the multiple component carriers based on the indication.

As indicated above, FIG. 4 is provided as an example. Other examples may differ from what is described with respect to FIG. 4.

Figure 5:
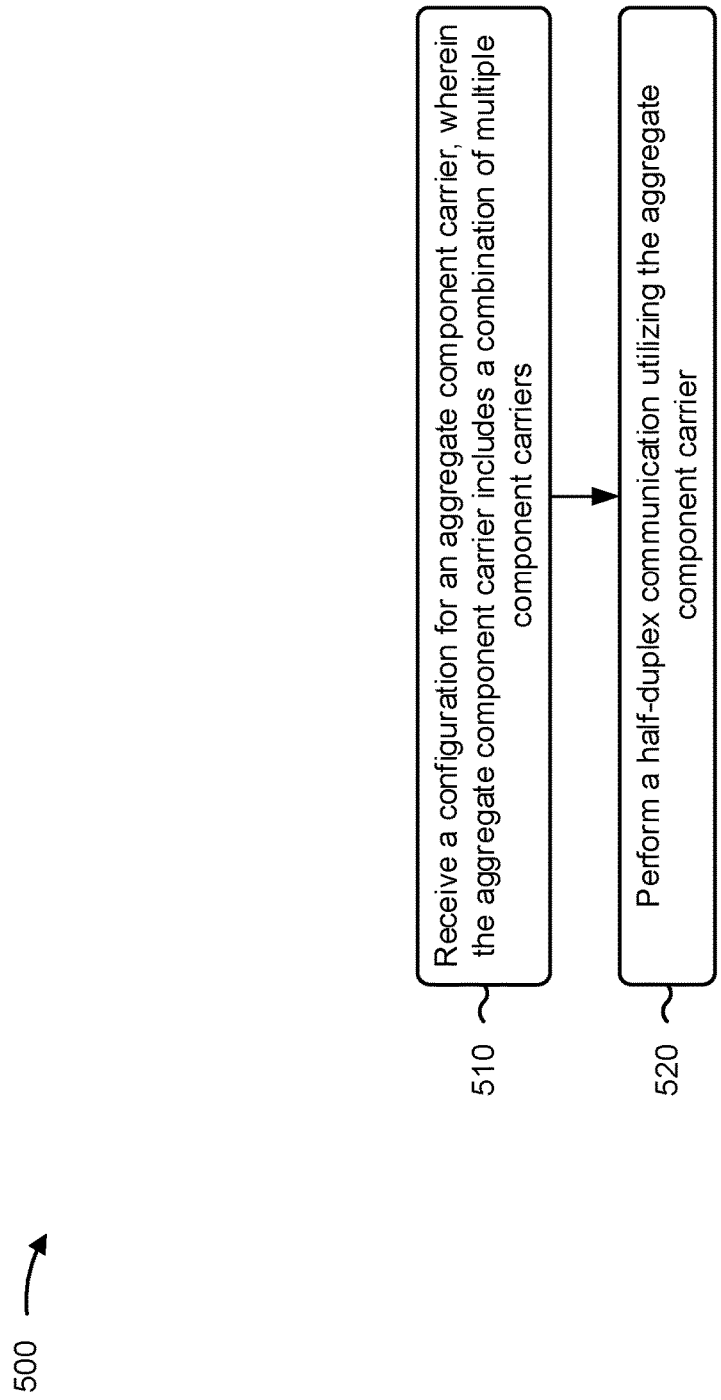
FIGS. 5 and 6 are diagrams illustrating example processes associated with aggregate component carrier for FD operation, in accordance with the present disclosure.

FIG. 5 is a diagram illustrating an example process 500 performed, for example, by an apparatus of a UE, in accordance with the present disclosure. Example process 500 is an example where the apparatus of the UE (e.g., an apparatus of UE 120) performs operations associated with an aggregate component carrier for full-duplex operation.

As shown in FIG. 5, in some aspects, process 500 may include receiving a configuration for an aggregate component carrier, wherein the aggregate component carrier includes a combination of multiple component carriers (block 510). For example, the apparatus (e.g., using communication manager 140 and/or reception component 702, depicted in FIG. 7) may receive a configuration for an aggregate component carrier, wherein the aggregate component carrier includes a combination of multiple component carriers, as described above.

As further shown in FIG. 5, in some aspects, process 500 may include performing an HD communication utilizing the aggregate component carrier (block 520). For example, the apparatus (e.g., using communication manager 140 and/or performance component 708, depicted in FIG. 7) may perform an HD communication utilizing the aggregate component carrier, as described above.

Process 500 may include additional aspects, such as any single aspect or any combination of aspects described below and/or in connection with one or more other processes described elsewhere herein.

In a first aspect, the multiple component carriers comprise contiguous component carriers.

In a second aspect, alone or in combination with the first aspect, the multiple component carriers comprise non-contiguous component carriers.

In a third aspect, alone or in combination with one or more of the first and second aspects, a first component carrier, of the multiple component carriers, at least partially overlaps with a second component carrier, of the multiple component carriers.

In a fourth aspect, alone or in combination with one or more of the first through third aspects, the multiple component carriers comprise intra-band component carriers.

In a fifth aspect, alone or in combination with one or more of the first through fourth aspects, the multiple component carriers comprise inter-band component carriers.

In a sixth aspect, alone or in combination with one or more of the first through fifth aspects, the aggregate component carrier is associated with a list of component carriers, and the list of component carriers includes the multiple component carriers.

In a seventh aspect, alone or in combination with one or more of the first through sixth aspects, each component carrier, of the multiple component carriers, overlaps in a frequency domain with the aggregate component carrier.

In an eighth aspect, alone or in combination with one or more of the first through seventh aspects, each component carrier, of the multiple component carriers, has a same SCS as other component carriers of the multiple component carriers.

In a ninth aspect, alone or in combination with one or more of the first through eighth aspects, the aggregate component carrier and the multiple component carriers have a same SCS.

In a tenth aspect, alone or in combination with one or more of the first through ninth aspects, an SCS of the aggregate component carrier is different from an SCS of one or more component carriers of the multiple component carriers.

In an eleventh aspect, alone or in combination with one or more of the first through tenth aspects, the list of component carriers indicates a primary component carrier, and a configuration of the aggregate component carrier is based at least in part on a configuration of the primary component carrier.

In a twelfth aspect, alone or in combination with one or more of the first through eleventh aspects, the UE is semi-statically configured to operate in the aggregate component carrier or the multiple component carriers during a time slot.

In a thirteenth aspect, alone or in combination with one or more of the first through twelfth aspects, the UE operates in the aggregate component carrier when the UE is operating in an HD mode, and the UE operates in the multiple component carriers when the UE is operating in an FD mode.

In a fourteenth aspect, alone or in combination with one or more of the first through thirteenth aspects, process 500 includes receiving an indication, and switching from operating in the multiple component carriers to operating in the aggregate component carrier based at least in part on the indication.

In a fifteenth aspect, alone or in combination with one or more of the first through fourteenth aspects, the indication is received via one or more of layer 1 signaling or layer 2 signaling.

In a sixteenth aspect, alone or in combination with one or more of the first through fifteenth aspects, process 500 includes receiving another indication, and switching from operating in the aggregate component carrier to operating in the multiple component carriers based at least in part on the other indication.

In a seventeenth aspect, alone or in combination with one or more of the first through sixteenth aspects, process 500 includes receiving an SFI associated with the aggregate component carrier, wherein a slot format of the aggregate component carrier is based at least in part on the SFI.

In an eighteenth aspect, alone or in combination with one or more of the first through seventeenth aspects, an SFI associated with the aggregate component carrier corresponds to an SFI of a component carrier, of the multiple component carriers.

In a nineteenth aspect, alone or in combination with one or more of the first through eighteenth aspects, an RRC configuration provides a mapping between a slot format associated with a component carrier, of the multiple component carriers, and a slot format associated with the aggregate component carrier.

In a twentieth aspect, alone or in combination with one or more of the first through nineteenth aspects, a configuration of the aggregate component carrier is separate from a configuration of the multiple component carriers.

In a twenty-first aspect, alone or in combination with one or more of the first through twentieth aspects, the aggregate component carrier is configured with one or more BWPs.

In a twenty-second aspect, alone or in combination with one or more of the first through twenty-first aspects, only one BWP, of the one or more BWPs, is active during a time period.

In a twenty-third aspect, alone or in combination with one or more of the first through twenty-second aspects, the one or more BWPs include one or more BWPs associated with the multiple component carriers.

In a twenty-fourth aspect, alone or in combination with one or more of the first through twenty-third aspects, the multiple component carriers include a first component carrier associated with a first BWP and a second component carrier associated with a second BWP, wherein a frequency band separates the first BWP and the second BWP in a frequency domain, and wherein the one or more BWPs include only the first BWP and the second BWP.

In a twenty-fifth aspect, alone or in combination with one or more of the first through twenty-fourth aspects, the multiple component carriers include a first component carrier associated with a first BWP and a second component carrier associated with a second BWP, wherein a frequency band separates the first BWP and the second BWP in a frequency domain, and wherein the one or more BWPs include the first BWP, the second BWP, and the frequency band.

In a twenty-sixth aspect, alone or in combination with one or more of the first through twenty-fifth aspects, a BWP associated with the aggregate component carrier is configured by the UE.

In a twenty-seventh aspect, alone or in combination with one or more of the first through twenty-sixth aspects, an RRC configuration indicates a configuration of a BWP associated with the aggregate component carrier.

In a twenty-eighth aspect, alone or in combination with one or more of the first through twenty-seventh aspects, the aggregate component carrier is associated with a PDSCH, and a configuration of a BWP associated with the aggregate component carrier corresponds to a configuration of a first component carrier, of the multiple component carriers, based at least in part on the aggregate component carrier being associated with the PDSCH.

In a twenty-ninth aspect, alone or in combination with one or more of the first through twenty-eighth aspects, process 500 includes receiving DCI indicating a component carrier, of the multiple component carriers, or the aggregate component carrier, on which scheduling resources on a PDSCH is to occur.

In a thirtieth aspect, alone or in combination with one or more of the first through twenty-ninth aspects, process 500 includes receiving information allocating one or more of resources associated with a HARQ acknowledgement for the aggregate component carrier, or resources associated with a HARQ acknowledgement for the multiple component carriers.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
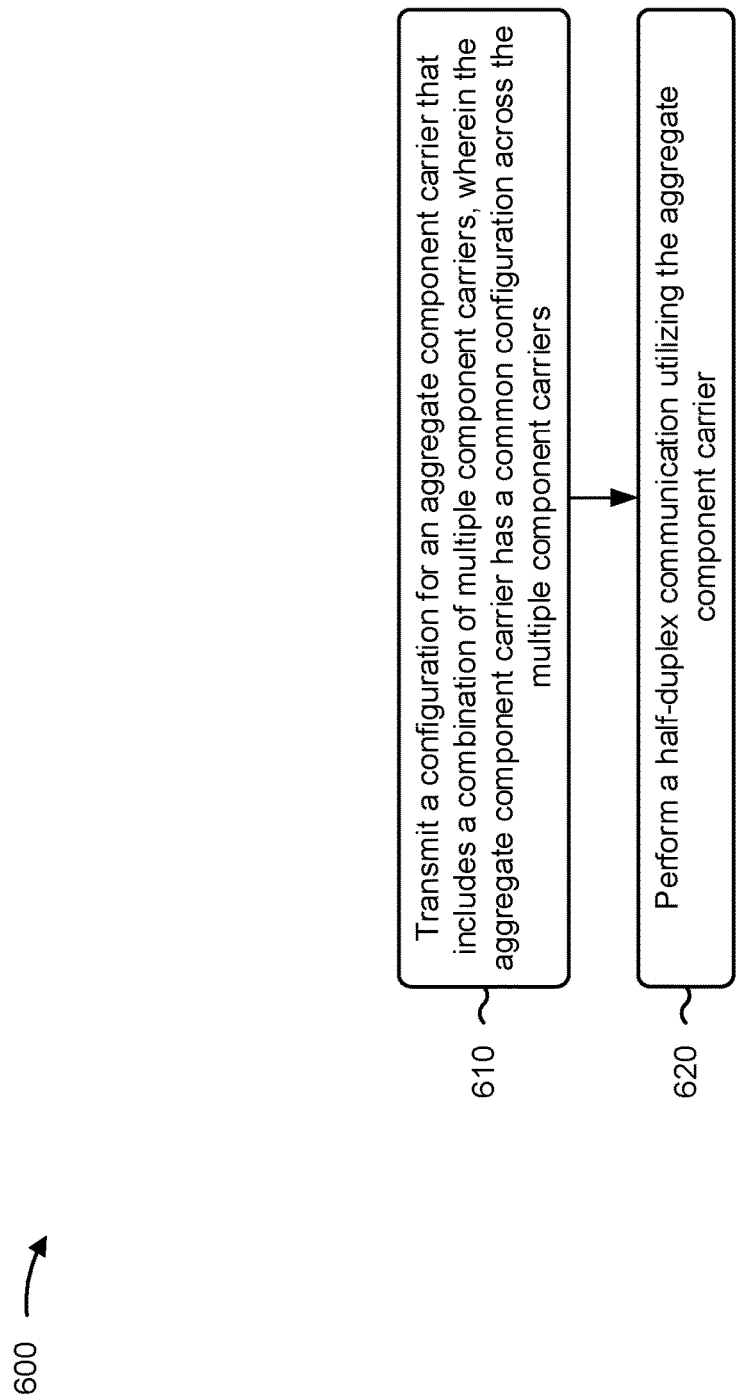

FIG. 6 is a diagram illustrating an example process 600 performed, for example, by an apparatus of a base station, in accordance with the present disclosure. Example process 600 is an example where the apparatus of the base station (e.g., an apparatus of a base station 110) performs operations associated with an aggregate component carrier for FD operation.

As shown in FIG. 6, in some aspects, process 600 may include transmitting a configuration for an aggregate component carrier that includes a combination of multiple component carriers, wherein the aggregate component carrier has a common configuration across the multiple component carriers (block 610). For example, the apparatus (e.g., using communication manager 150 and/or transmission component 804, depicted in FIG. 8) may transmit a configuration for an aggregate component carrier that includes a combination of multiple component carriers, wherein the aggregate component carrier has a common configuration across the multiple component carriers, as described above.

As further shown in FIG. 6, in some aspects, process 600 may include performing an HD communication utilizing the aggregate component carrier (block 620). For example, the apparatus (e.g., using communication manager 150 and/or performance component 808, depicted in FIG. 8) may perform an HD communication utilizing the aggregate component carrier, as described above.

Process 600 may include additional aspects, such as any single aspect or any combination of aspects described below and/or in connection with one or more other processes described elsewhere herein.

In a first aspect, the multiple component carriers comprise contiguous component carriers.

In a second aspect, alone or in combination with the first aspect, the multiple component carriers comprise non-contiguous component carriers.

In a third aspect, alone or in combination with one or more of the first and second aspects, a first component carrier, of the multiple component carriers, at least partially overlaps with a second component carrier, of the multiple component carriers.

In a fourth aspect, alone or in combination with one or more of the first through third aspects, the multiple component carriers comprise intra-band component carriers.

In a fifth aspect, alone or in combination with one or more of the first through fourth aspects, the multiple component carriers comprise inter-band component carriers.

In a sixth aspect, alone or in combination with one or more of the first through fifth aspects, the aggregate component carrier is associated with a list of component carriers, and the list of component carriers includes the multiple component carriers.

In a seventh aspect, alone or in combination with one or more of the first through sixth aspects, each component carrier, of the multiple component carriers, overlaps in a frequency domain with the aggregate component carrier.

In an eighth aspect, alone or in combination with one or more of the first through seventh aspects, each component carrier, of the multiple component carriers, has a same SCS.

In a ninth aspect, alone or in combination with one or more of the first through eighth aspects, the aggregate component carrier and the multiple component carriers have a same SCS.

In a tenth aspect, alone or in combination with one or more of the first through ninth aspects, an SCS of the aggregate component carrier is different from an SCS of one or more component carriers of the multiple component carriers.

In an eleventh aspect, alone or in combination with one or more of the first through tenth aspects, the indication is transmitted via one or more of layer 1 signaling or layer 2 signaling.

In a twelfth aspect, alone or in combination with one or more of the first through eleventh aspects, process 600 includes transmitting an SFI associated with the aggregate component carrier, wherein a slot format of the aggregate component carrier is based at least in part on the SFI.

In a thirteenth aspect, alone or in combination with one or more of the first through twelfth aspects, an SFI associated with the aggregate component carrier corresponds to an SFI of a component carrier, of the multiple component carriers.

In a fourteenth aspect, alone or in combination with one or more of the first through thirteenth aspects, an RRC configuration provides a mapping between a slot format associated with a component carrier, of the multiple component carriers, and a slot format associated with the aggregate component carrier.

In a fifteenth aspect, alone or in combination with one or more of the first through fourteenth aspects, a configuration of the aggregate component carrier is separate from a configuration of the multiple component carriers.

In a sixteenth aspect, alone or in combination with one or more of the first through fifteenth aspects, the aggregate component carrier is configured with one or more BWPs.

In a seventeenth aspect, alone or in combination with one or more of the first through sixteenth aspects, only one BWP, of the one or more BWPs, is active during a time period.

In an eighteenth aspect, alone or in combination with one or more of the first through seventeenth aspects, the one or more BWPs include one or more BWPs associated with the multiple component carriers.

In a nineteenth aspect, alone or in combination with one or more of the first through eighteenth aspects, the multiple component carriers include a first component carrier associated with a first BWP and a second component carrier associated with a second BWP, wherein a frequency band separates the first BWP and the second BWP in a frequency domain, and wherein the one or more BWPs include only the first BWP and the second BWP.

In a twentieth aspect, alone or in combination with one or more of the first through nineteenth aspects, the multiple component carriers include a first component carrier associated with a first BWP and a second component carrier associated with a second BWP, wherein a frequency band separates the first BWP and the second BWP in a frequency domain, and wherein the one or more BWPs include the first BWP, the second BWP, and the frequency band.

In a twenty-first aspect, alone or in combination with one or more of the first through twentieth aspects, a BWP associated with the aggregate component carrier is configured by a UE.

In a twenty-second aspect, alone or in combination with one or more of the first through twenty-first aspects, an RRC configuration indicates a configuration of a BWP associated with the aggregate component carrier.

In a twenty-third aspect, alone or in combination with one or more of the first through twenty-second aspects, the aggregate component carrier is associated with a PDSCH, and a configuration of a BWP associated with the aggregate component carrier corresponds to a configuration of a first component carrier, of the multiple component carriers, based at least in part on the aggregate component carrier being associated with the PDSCH.

In a twenty-fourth aspect, alone or in combination with one or more of the first through twenty-third aspects, process 600 includes transmitting DCI indicating a component carrier, of the component carriers, or the aggregate component carrier, on which scheduling resources on a PDSCH is to occur.

In a twenty-fifth aspect, alone or in combination with one or more of the first through twenty-fourth aspects, process 600 includes transmitting information allocating one or more of resources associated with a HARQ acknowledgement for the aggregate component carrier, or resources associated with a HARQ acknowledgement for the multiple component carriers.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
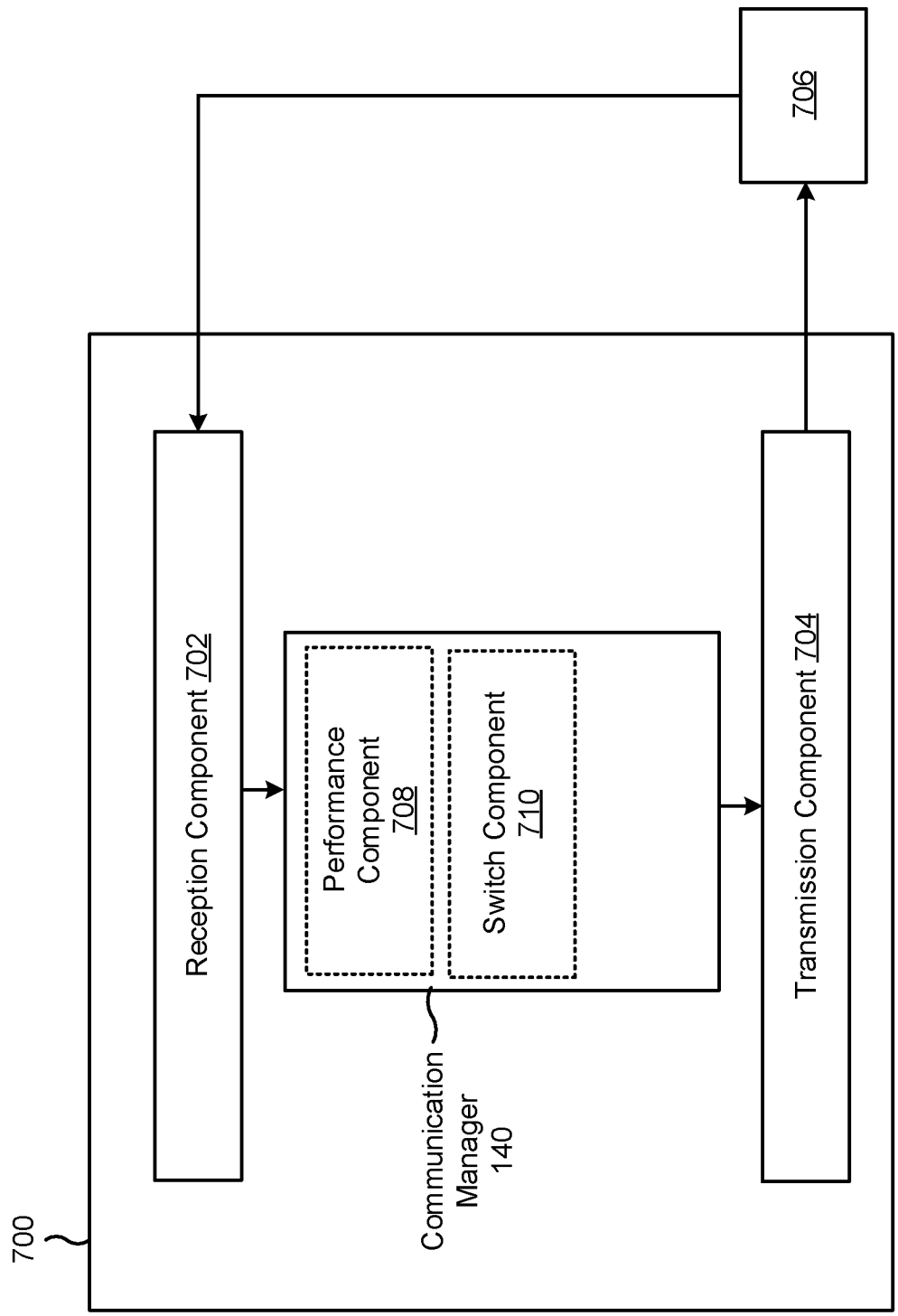
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a performance component 708 and/or a switch component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a configuration for an aggregate component carrier, wherein the aggregate component carrier includes a combination of multiple component carriers. The performance component 708 may perform an HD communication utilizing the aggregate component carrier.

The reception component 702 may receive an indication. The switch component 710 may switch from operating in the multiple component carriers to operating in the aggregate component carrier based at least in part on the indication.

The reception component 702 may receive another indication. The switch component 710 may switch from operating in the aggregate component carrier to operating in the multiple component carriers based at least in part on the other indication.

The reception component 702 may receive an SFI associated with the aggregate component carrier, wherein a slot format of the aggregate component carrier is based at least in part on the SFI.

The reception component 702 may receive DCI indicating a component carrier, of the multiple component carriers, or the aggregate component carrier, on which scheduling resources on a physical downlink shared channel is to occur.

The reception component 702 may receive information allocating one or more of resources associated with a HARQ acknowledgement for the aggregate component carrier, or resources associated with a HARQ acknowledgement for the multiple component carriers.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
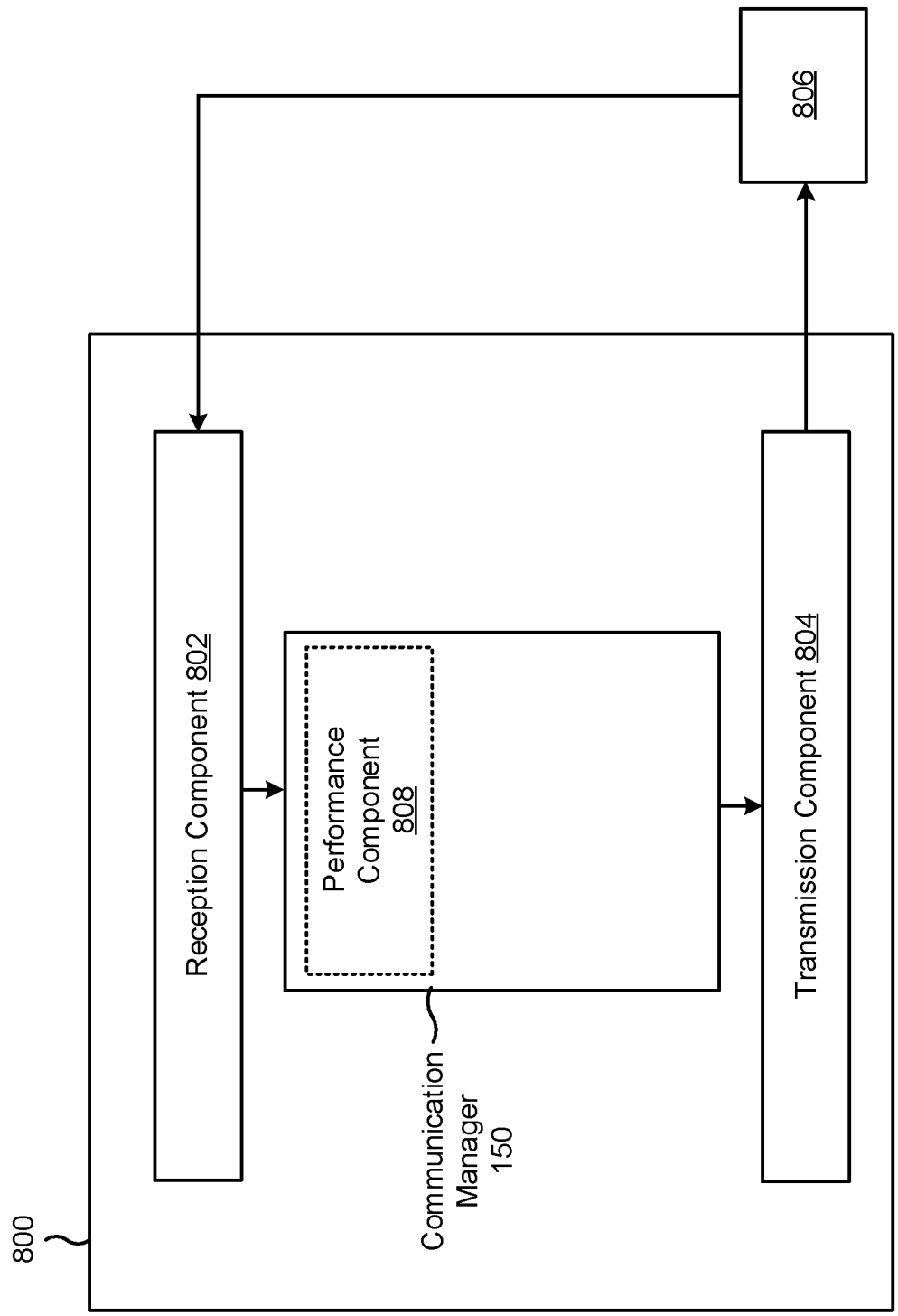

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a performance component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a configuration for an aggregate component carrier that includes a combination of multiple component carriers, wherein the aggregate component carrier has a common configuration across the multiple component carriers. The performance component 808 may perform an HD communication utilizing the aggregate component carrier.

The transmission component 804 may transmit an SFI associated with the aggregate component carrier, wherein a slot format of the aggregate component carrier is based at least in part on the SFI.

The transmission component 804 may transmit downlink control information indicating a component carrier, of the component carriers, or the aggregate component carrier, on which scheduling resources on a physical downlink shared channel is to occur.

The transmission component 804 may transmit information allocating one or more of resources associated with a HARQ acknowledgement for the aggregate component carrier, or resources associated with a HARQ acknowledgement for the multiple component carriers.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by an apparatus of a UE, comprising: receiving a configuration for an aggregate component carrier, wherein the aggregate component carrier includes a combination of multiple component carriers; and performing an HD communication utilizing the aggregate component carrier.

Aspect 2: The method of Aspect 1, wherein the multiple component carriers comprise contiguous component carriers.

Aspect 3: The method of one or more of Aspects 1 and 2, wherein the multiple component carriers comprise non-contiguous component carriers.

Aspect 4: The method of one or more of Aspects 1 through 3, wherein a first component carrier, of the multiple component carriers, at least partially overlaps with a second component carrier, of the multiple component carriers.

Aspect 5: The method of one or more of Aspects 1 through 4, wherein the multiple component carriers comprise intra-band component carriers.

Aspect 6: The method of one or more of Aspects 1 through 5, wherein the multiple component carriers comprise inter-band component carriers.

Aspect 7: The method of one or more of Aspects 1 through 6, wherein the aggregate component carrier is associated with a list of component carriers, and wherein the list of component carriers includes the multiple component carriers.

Aspect 8: The method of Aspect 7, wherein each component carrier, of the multiple component carriers, overlaps in a frequency domain with the aggregate component carrier.

Aspect 9: The method of Aspect 7, wherein each component carrier, of the multiple component carriers, has a same SCS.

Aspect 10: The method of Aspect 7, wherein the aggregate component carrier and the multiple component carriers have a same SCS.

Aspect 11: The method of Aspect 7, wherein an SCS of the aggregate component carrier is different from an SCS of one or more component carriers of the multiple component carriers.

Aspect 12: The method of Aspect 7, wherein the list of component carriers indicates a primary component carrier, and wherein a configuration of the aggregate component carrier is based at least in part on a configuration of the primary component carrier.

Aspect 13: The method of one or more of Aspects 1 through 12, wherein the UE is semi-statically configured to operate in the aggregate component carrier or the multiple component carriers during a time slot.

Aspect 14: The method of one or more of Aspects 1 through 13, wherein the UE operates in the aggregate component carrier when the UE is operating in an HD mode, and wherein the UE operates in the multiple component carriers when the UE is operating in an FD mode.

Aspect 15: The method of one or more of Aspects 1 through 14, further comprising: receiving an indication; and switching from operating in the multiple component carriers to operating in the aggregate component carrier based at least in part on the indication.

Aspect 16: The method of Aspect 15, wherein the indication is received via one or more of layer 1 signaling or layer 2 signaling.

Aspect 17: The method of Aspect 15, further comprising: receiving another indication; and switching from operating in the aggregate component carrier to operating in the multiple component carriers based at least in part on the other indication.

Aspect 18: The method of one or more of Aspects 1 through 17, further comprising: receiving an SFI associated with the aggregate component carrier, wherein a slot format of the aggregate component carrier is based at least in part on the SFI.

Aspect 19: The method of one or more of Aspects 1 through 18, wherein an SFI associated with the aggregate component carrier corresponds to an SFI of a component carrier, of the multiple component carriers.

Aspect 20: The method of one or more of Aspects 1 through 19, wherein an RRC configuration provides a mapping between a slot format associated with a component carrier, of the multiple component carriers, and a slot format associated with the aggregate component carrier.

Aspect 21: The method of one or more of Aspects 1 through 20, wherein a configuration of the aggregate component carrier is separate from a configuration of the multiple component carriers.

Aspect 22: The method of one or more of Aspects 1 through 21, wherein the aggregate component carrier is configured with one or more BWPs.

Aspect 23: The method of Aspect 22, wherein only one BWP, of the one or more BWPs, is active during a time period.

Aspect 24: The method of Aspect 22, wherein the one or more BWPs include one or more BWPs associated with the multiple component carriers.

Aspect 25: The method of Aspect 22, wherein the multiple component carriers include a first component carrier associated with a first BWP and a second component carrier associated with a second BWP, wherein a frequency band separates the first BWP and the second BWP in a frequency domain, and wherein the one or more BWPs include only the first BWP and the second BWP.

Aspect 26: The method of Aspect 22, wherein the multiple component carriers include a first component carrier associated with a first BWP and a second component carrier associated with a second BWP, wherein a frequency band separates the first BWP and the second BWP in a frequency domain, and wherein the one or more BWPs include the first BWP, the second BWP, and the frequency band.

Aspect 27: The method of one or more of Aspects 1 through 26, wherein a BWP associated with the aggregate component carrier is configured by the UE.

Aspect 28: The method of one or more of Aspects 1 through 27, wherein an RRC configuration indicates a configuration of a bandwidth part associated with the aggregate component carrier.

Aspect 29: The method of one or more of Aspects 1 through 28, wherein the aggregate component carrier is associated with a PDSCH, and wherein a configuration of a BWP associated with the aggregate component carrier corresponds to a configuration of a first component carrier, of the multiple component carriers, based at least in part on the aggregate component carrier being associated with the PDSCH.

Aspect 30: The method of one or more of Aspects 1 through 29, further comprising: receiving DCI indicating a component carrier, of the multiple component carriers, or the aggregate component carrier, on which scheduling resources on a PDSCH is to occur.

Aspect 31: The method of one or more of Aspects 1 through 30, further comprising: receiving information allocating one or more of: resources associated with a HARQ acknowledgement for the aggregate component carrier, or resources associated with a HARQ acknowledgement for the multiple component carriers.

Aspect 32: A method of wireless communication performed by an apparatus of a base station, comprising: transmitting a configuration for an aggregate component carrier that includes a combination of multiple component carriers, wherein the aggregate component carrier has a common configuration across the multiple component carriers; and performing an HD communication utilizing the aggregate component carrier.

Aspect 33: The method of Aspect 32, wherein the multiple component carriers comprise contiguous component carriers.

Aspect 34: The method of one or more of Aspects 32 and 33, wherein the multiple component carriers comprise non-contiguous component carriers.

Aspect 35: The method of one or more of Aspects 32 through 34, wherein a first component carrier, of the multiple component carriers, at least partially overlaps with a second component carrier, of the multiple component carriers.

Aspect 36: The method of one or more of Aspects 32 through 35, wherein the multiple component carriers comprise intra-band component carriers.

Aspect 37: The method of one or more of Aspects 32 through 36, wherein the multiple component carriers comprise inter-band component carriers.

Aspect 38: The method of one or more of Aspects 32 through 37, wherein the aggregate component carrier is associated with a list of component carriers, and wherein the list of component carriers includes the multiple component carriers.

Aspect 39: The method of Aspect 38, wherein each component carrier, of the multiple component carriers, overlaps in a frequency domain with the aggregate component carrier.

Aspect 40: The method of Aspect 38, wherein each component carrier, of the multiple component carriers, has a same SCS.

Aspect 41: The method of Aspect 38, wherein the aggregate component carrier and the multiple component carriers have a same SCS.

Aspect 42: The method of Aspect 38, wherein an SCS of the aggregate component carrier is different from an SCS of one or more component carriers of the multiple component carriers.

Aspect 43: The method of one or more of Aspects 32 through 42, wherein the indication is transmitted via one or more of layer 1 signaling or layer 2 signaling.

Aspect 44: The method of one or more of Aspects 32 through 43, further comprising: transmitting an SFI associated with the aggregate component carrier, wherein a slot format of the aggregate component carrier is based at least in part on the SFI.

Aspect 45: The method of one or more of Aspects 32 through 44, wherein an SFI associated with the aggregate component carrier corresponds to an SFI of a component carrier, of the multiple component carriers.

Aspect 46: The method of one or more of Aspects 32 through 45, wherein an RRC configuration provides a mapping between a slot format associated with a component carrier, of the multiple component carriers, and a slot format associated with the aggregate component carrier.

Aspect 47: The method of one or more of Aspects 32 through 46, wherein a configuration of the aggregate component carrier is separate from a configuration of the multiple component carriers.

Aspect 48: The method of one or more of Aspects 32 through 47, wherein the aggregate component carrier is configured with one or more BWPs.

Aspect 49: The method of Aspect 48, wherein only one BWP, of the one or more BWPs, is active during a time period.

Aspect 50: The method of Aspect 48, wherein the one or more BWPs include one or more BWPs associated with the multiple component carriers.

Aspect 51: The method of Aspect 48, wherein the multiple component carriers include a first component carrier associated with a first BWP and a second component carrier associated with a second BWP, wherein a frequency band separates the first BWP and the second BWP in a frequency domain, and wherein the one or more BWPs include only the first BWP and the second BWP.

Aspect 52: The method of Aspect 48, wherein the multiple component carriers include a first component carrier associated with a first BWP and a second component carrier associated with a second BWP, wherein a frequency band separates the first BWP and the second BWP in a frequency domain, and wherein the one or more BWPs include the first BWP, the second BWP, and the frequency band.

Aspect 53: The method of one or more of Aspects 32 through 52, wherein a BWP associated with the aggregate component carrier is configured by a UE.

Aspect 54: The method of one or more of Aspects 32 through 53, wherein an RRC configuration indicates a configuration of a BWP associated with the aggregate component carrier.

Aspect 55: The method of one or more of Aspects 32 through 54, wherein the aggregate component carrier is associated with a PDSCH, and wherein a configuration of a BWP associated with the aggregate component carrier corresponds to a configuration of a first component carrier, of the multiple component carriers, based at least in part on the aggregate component carrier being associated with the PDSCH.

Aspect 56: The method of one or more of Aspects 32 through 55, further comprising: transmitting DCI indicating a component carrier, of the component carriers, or the aggregate component carrier, on which scheduling resources on a PDSCH is to occur.

Aspect 57: The method of one or more of Aspects 32 through 56, further comprising: transmitting information allocating one or more of: resources associated with a HARQ acknowledgement for the aggregate component carrier, or resources associated with a HARQ acknowledgement for the multiple component carriers.

Aspect 58: An apparatus for wireless communication at a device, comprising a processor; memory coupled with the processor; and instructions stored in the memory and executable by the processor to cause the apparatus to perform the method of one or more of Aspects 1 through 31.

Aspect 59: A device for wireless communication, comprising a memory and one or more processors coupled to the memory, the one or more processors configured to perform the method of one or more of Aspects 1 through 31.

Aspect 60: An apparatus for wireless communication, comprising at least one means for performing the method of one or more of Aspects 1 through 31.

Aspect 61: A non-transitory computer-readable medium storing code for wireless communication, the code comprising instructions executable by a processor to perform the method of one or more of Aspects 1 through 31.

Aspect 62: A non-transitory computer-readable medium storing a set of instructions for wireless communication, the set of instructions comprising one or more instructions that, when executed by one or more processors of a device, cause the device to perform the method of one or more of Aspects 1 through 31.

Aspect 63: An apparatus for wireless communication at a device, comprising a processor; memory coupled with the processor; and instructions stored in the memory and executable by the processor to cause the apparatus to perform the method of one or more of Aspects 32 through 57.

Aspect 64: A device for wireless communication, comprising a memory and one or more processors coupled to the memory, the one or more processors configured to perform the method of one or more of Aspects 32 through 57.

Aspect 65: An apparatus for wireless communication, comprising at least one means for performing the method of one or more of Aspects 32 through 57.

Aspect 66: A non-transitory computer-readable medium storing code for wireless communication, the code comprising instructions executable by a processor to perform the method of one or more of Aspects 32 through 57.

Aspect 67: A non-transitory computer-readable medium storing a set of instructions for wireless communication, the set of instructions comprising one or more instructions that, when executed by one or more processors of a device, cause the device to perform the method of one or more of Aspects 32 through 57.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to:
        receive a configuration for an aggregate component carrier, wherein the aggregate component carrier includes a combination of multiple component carriers and one or more guard bands,
        wherein the combination of the multiple component carriers and the one or more guard bands of the aggregate component carrier is used to perform a half-duplex communication;
        receive an indication; and
        switch from operating in the multiple component carriers to operating in the aggregate component carrier based at least in part on the indication.

2. The apparatus of claim 1, wherein the multiple component carriers comprise contiguous component carriers.

3. The apparatus of claim 1, wherein the multiple component carriers comprise non-contiguous component carriers.

4. The apparatus of claim 1, wherein a first component carrier, of the multiple component carriers, at least partially overlaps with a second component carrier, of the multiple component carriers.

5. The apparatus of claim 1, wherein the multiple component carriers comprise intra-band component carriers.

6. The apparatus of claim 1, wherein the multiple component carriers comprise inter-band component carriers.

7. The apparatus of claim 1, wherein the aggregate component carrier is associated with a list of component carriers, and wherein the list of component carriers includes the multiple component carriers.

8. The apparatus of claim 7, wherein each component carrier, of the multiple component carriers, overlaps in a frequency domain with the aggregate component carrier.

9. The apparatus of claim 7, wherein each component carrier, of the multiple component carriers, has a same subcarrier spacing (SCS).

10. The apparatus of claim 7, wherein the aggregate component carrier and the multiple component carriers have a same subcarrier spacing (SCS).

11. The apparatus of claim 7, wherein a subcarrier spacing (SCS) of the aggregate component carrier is different from an SCS of one or more component carriers of the multiple component carriers.

12. The apparatus of claim 7, wherein the list of component carriers indicates a primary component carrier, and wherein the configuration of the aggregate component carrier is based at least in part on a configuration of the primary component carrier.

13. The apparatus of claim 1, wherein the UE is semi-statically configured to operate in the aggregate component carrier or the multiple component carriers during a time slot.

14. The apparatus of claim 1, wherein the UE is configured to operate in the aggregate component carrier when the UE is operating in a half-duplex mode, and wherein the UE is configured to operate in the multiple component carriers when the UE is operating in a full-duplex mode.

15. The apparatus of claim 1, wherein the indication is via one or more of layer 1 signaling or layer 2 signaling.

16. The apparatus of claim 1, wherein the one or more processors are further configured to:
    receive another indication; and
    switch from operating in the aggregate component carrier to operating in the multiple component carriers based at least in part on the other indication.

17. The apparatus of claim 1, wherein the one or more processors are further configured to:
    receive a slot format indicator (SFI) associated with the aggregate component carrier, wherein a slot format of the aggregate component carrier is based at least in part on the SFI.

18. The apparatus of claim 1, wherein a slot format indicator (SFI) associated with the aggregate component carrier corresponds to an SFI of a component carrier, of the multiple component carriers.

19. The apparatus of claim 1, wherein a radio resource control configuration provides a mapping between a slot format associated with a component carrier, of the multiple component carriers, and a slot format associated with the aggregate component carrier.

20. The apparatus of claim 1, wherein the configuration of the aggregate component carrier is separate from a configuration of the multiple component carriers.

21. The apparatus of claim 1, wherein the aggregate component carrier is configured with one or more bandwidth parts, and wherein only one bandwidth part, of the one or more bandwidth parts, is active during a time period.

22. The apparatus of claim 21, wherein the one or more bandwidth parts include one or more bandwidth parts associated with the multiple component carriers.

23. The apparatus of claim 21, wherein the multiple component carriers include a first component carrier associated with a first bandwidth part and a second component carrier associated with a second bandwidth part, wherein a frequency band separates the first bandwidth part and the second bandwidth part in a frequency domain, and wherein the one or more bandwidth parts include only the first bandwidth part and the second bandwidth part.

24. The apparatus of claim 21, wherein the multiple component carriers include a first component carrier associated with a first bandwidth part and a second component carrier associated with a second bandwidth part, wherein a frequency band separates the first bandwidth part and the second bandwidth part in a frequency domain, and wherein the one or more bandwidth parts include the first bandwidth part, the second bandwidth part, and the frequency band.

25. The apparatus of claim 1, wherein the aggregate component carrier is associated with a physical downlink shared channel (PDSCH), and wherein a configuration of a bandwidth part associated with the aggregate component carrier corresponds to a configuration of a first component carrier, of the multiple component carriers, based at least in part on the aggregate component carrier being associated with the PDSCH.

26. The apparatus of claim 1, wherein the one or more processors are further configured to:
receive information allocating one or more of:
a component carrier, of the multiple component carriers, or the aggregate component carrier, on which scheduling resources on a physical downlink shared channel is to occur,
resources associated with a hybrid automatic repeat request (HARQ) acknowledgement for the aggregate component carrier, or
resources associated with a HARQ acknowledgement for the multiple component carriers.

27. An apparatus for wireless communication at a network entity, comprising:
one or more memories; and
one or more processors, coupled to the one or more memories, configured to:
transmit a configuration for an aggregate component carrier that includes a combination of multiple component carriers and one or more guard bands, wherein the aggregate component carrier has a common configuration across the multiple component carriers,
wherein the combination of the multiple component carriers and the one or more guard bands of the aggregate component carrier is used to perform a half-duplex communication;
receive an indication; and
switch from operating in the multiple component carriers to operating in the aggregate component carrier based at least in part on the indication.

28. The apparatus of claim 27, wherein the one or more processors are further configured to:
transmit downlink control information indicating a component carrier, of the component carriers, or the aggregate component carrier, on which scheduling resources on a physical downlink shared channel is to occur.

29. The apparatus of claim 27, wherein the one or more processors are further configured to:
transmit information allocating one or more of:
resources associated with a hybrid automatic repeat request (HARQ) acknowledgement for the aggregate component carrier, or
resources associated with a HARQ acknowledgement for the multiple component carriers.

* * * * *